(12) United States Patent
Ikuno

(10) Patent No.: US 11,529,828 B2
(45) Date of Patent: Dec. 20, 2022

(54) PNEUMATIC TIRE

(71) Applicant: TOYO TIRE CORPORATION, Itami (JP)

(72) Inventor: Yusuke Ikuno, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 337 days.

(21) Appl. No.: 16/708,955

(22) Filed: Dec. 10, 2019

(65) Prior Publication Data

US 2020/0207154 A1 Jul. 2, 2020

(30) Foreign Application Priority Data

Dec. 27, 2018 (JP) .............................. JP2018-245808

(51) Int. Cl.
*B60C 11/03* (2006.01)
*B60C 11/13* (2006.01)

(52) U.S. Cl.
CPC ... *B60C 11/0306* (2013.01); *B60C 2011/0348* (2013.01); *B60C 2011/0358* (2013.01)

(58) Field of Classification Search
CPC ............. B60C 11/1384; B60C 11/0306; B60C 11/0309; B60C 11/03
See application file for complete search history.

(56) References Cited

U.S. PATENT DOCUMENTS 3,998,256 A * 12/1976 Verdier .................... B60C 11/11
152/902
5,967,210 A * 10/1999 Himuro ............... B60C 11/1384
152/209.9
2008/0185084 A1 * 8/2008 Dumigan ............ B60C 11/0306
152/209.15
2018/0236818 A1 * 8/2018 Ishigaki .............. B60C 11/1236
2020/0317003 A1 * 10/2020 Yoshida .................. B60C 11/13

FOREIGN PATENT DOCUMENTS

| JP | 2006-321342 A | 11/2006 |
| JP | 2009-6877 A | 1/2009 |
| JP | 2017-56892 A | 3/2017 |

OTHER PUBLICATIONS

Office Action dated Sep. 2, 2021, issued in counterpart ON application No. 201911278326.X, with English translation. (13 pages).
Office Action dated Sep. 13, 2022, issued in counterpart JP application No. 2018-245808, with the English machine translation. (5 pages).

* cited by examiner

*Primary Examiner* — Cedrick S Williams
(74) *Attorney, Agent, or Firm* — WHDA, LLP

(57) ABSTRACT

A pneumatic tire includes a block formed by a main groove extending in a tire circumferential direction and a lateral groove extending in a tire width direction. The block includes a first inclined surface provided at a corner portion between a first side surface and a top surface, the first inclined surface extending obliquely toward a groove bottom of the main groove or the lateral groove defined by the first side surface, and a first narrow groove extending from a center of the block toward the first side surface, an outer end of the first narrow groove being located on the first inclined surface, the first narrow groove being smaller in groove width than the main groove and the lateral groove.

4 Claims, 4 Drawing Sheets

PNEUMATIC TIRE

CROSS-REFERENCE TO RELATED APPLICATIONS

This application claims priority of Japanese Patent Application No. 2018-245808 filed on Dec. 27, 2018, the content of which is incorporated herein by reference.

BACKGROUND OF THE INVENTION

Technical Field

The present invention relates to a pneumatic tire.

Related Art

JP 2017-56892 A discloses a pneumatic tire in which a plurality of blocks (land portions) are formed by a plurality of main grooves extending in a tire circumferential direction and a plurality of lateral grooves extending in a tire width direction. In the blocks, a plurality of sipes (narrow grooves) that increase the edge effect are formed.

SUMMARY

In the pneumatic tire disclosed in JP 2017-56892 A, the sipes extend to side surfaces of the blocks, which lowers the rigidity of the blocks and the steering stability afforded by the rigidity.

It is therefore an object of the present invention to provide a pneumatic tire that is higher in rigidity of a land portion and steering stability afforded by the rigidity with an edge effect kept high.

According to an aspect of the present invention, provided is a pneumatic tire including a block formed by at least one main groove extending in a tire circumferential direction and a pair of lateral grooves extending in a tire width direction and provided at a distance from each other in the tire circumferential direction, the block having at least three side surfaces and having a polygonal shape. In the pneumatic tire, the block includes a first inclined surface provided at a corner portion between a top surface of the block and a first side surface of the at least three side surfaces, the first inclined surface extending obliquely toward a groove bottom of the main groove or one of the lateral grooves defined by the first side surface, and a first narrow groove extending from a center of the block toward the first side surface, an outer end of the first narrow groove being located on the first inclined surface, the first narrow groove being smaller in groove width than the main groove and the lateral grooves.

According to this aspect, the edge effect can be kept high by the first narrow groove formed in the block. In general, a corner portion of a block formed by a side surface and a top surface is divided by formation of a narrow groove, which makes the corner portion prone to deform and in turn makes the rigidity prone to be lowered. However, according to this aspect, since the first inclined surface is provided on the first side surface, it is possible to eliminate a portion that has an acute angle and is thus prone to deform. Accordingly, it is possible to increase, by the first inclined surface, the rigidity of the block and the steering stability afforded by the rigidity with the edge effect kept high by the first narrow groove.

The block includes a base portion, and a first protruding portion, a second protruding portion, and a third protruding portion that protrude radially from the base portion in directions intersecting a tire radial direction, and the first narrow groove is formed extending from the base portion toward the first side surface included in the first protruding portion. In general, when a narrow groove is formed extending toward a side surface of a protruding portion of a block, the rigidity of the protruding portion tends to be remarkably lowered. However, according to this aspect, since the inclined surface is provided on the side surface included in the protruding portion, it is possible to effectively keep the rigidity of the block high and increase the steering stability as compared with a configuration where no inclined surface is provided.

An angle formed by the first side surface and the first inclined surface is in a range of from 120 degrees to 160 degrees, both inclusive. When the angle is too small, an area of the top surface is reduced. On the other hand, when the angle is too large, a degree of contribution to increasing the rigidity is reduced. According to this aspect, it is possible to effectively increase the rigidity of the block with the area of the top surface kept sufficient.

A raised portion raised outward in the tire radial direction is formed on a part of the groove bottom of the main groove or one of the lateral grooves, the part of the groove bottom being adjacent to the first side surface. According to this aspect, since the total height of the first side surface is reduced, it is possible to suppress deformation of the first side surface and in turn makes it possible to effectively increase the rigidity of a part of the block adjacent to the first side surface.

The block includes a second inclined surface provided at a corner portion between the top surface and a second side surface of the at least three side surfaces, the second inclined surface extending obliquely toward a groove bottom of the main groove or one of the lateral grooves defined by the second side surface, and a second narrow groove extending from the center of the block toward the second side surface, an outer end of the second narrow groove being located on the second inclined surface, the second narrow groove being smaller in groove width than the main groove and the lateral grooves and larger in groove width than the first narrow groove, and an angle formed by the second side surface and the second inclined surface is smaller than the angle formed by the first side surface and the first inclined surface. That is, the larger the groove width of the narrow groove, the larger the inclination angle of the inclined surface. According to this aspect, it is possible to effectively suppress deformation of the side surface of the block and in turn makes it possible to reliably increase the rigidity and the steering stability.

According to the pneumatic tire of the present invention, it is possible to increase the rigidity of the block and the steering stability afforded by the rigidity with the edge effect kept high.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, a description will be given of an embodiment of the present invention with reference to the drawings.

Figure 1:
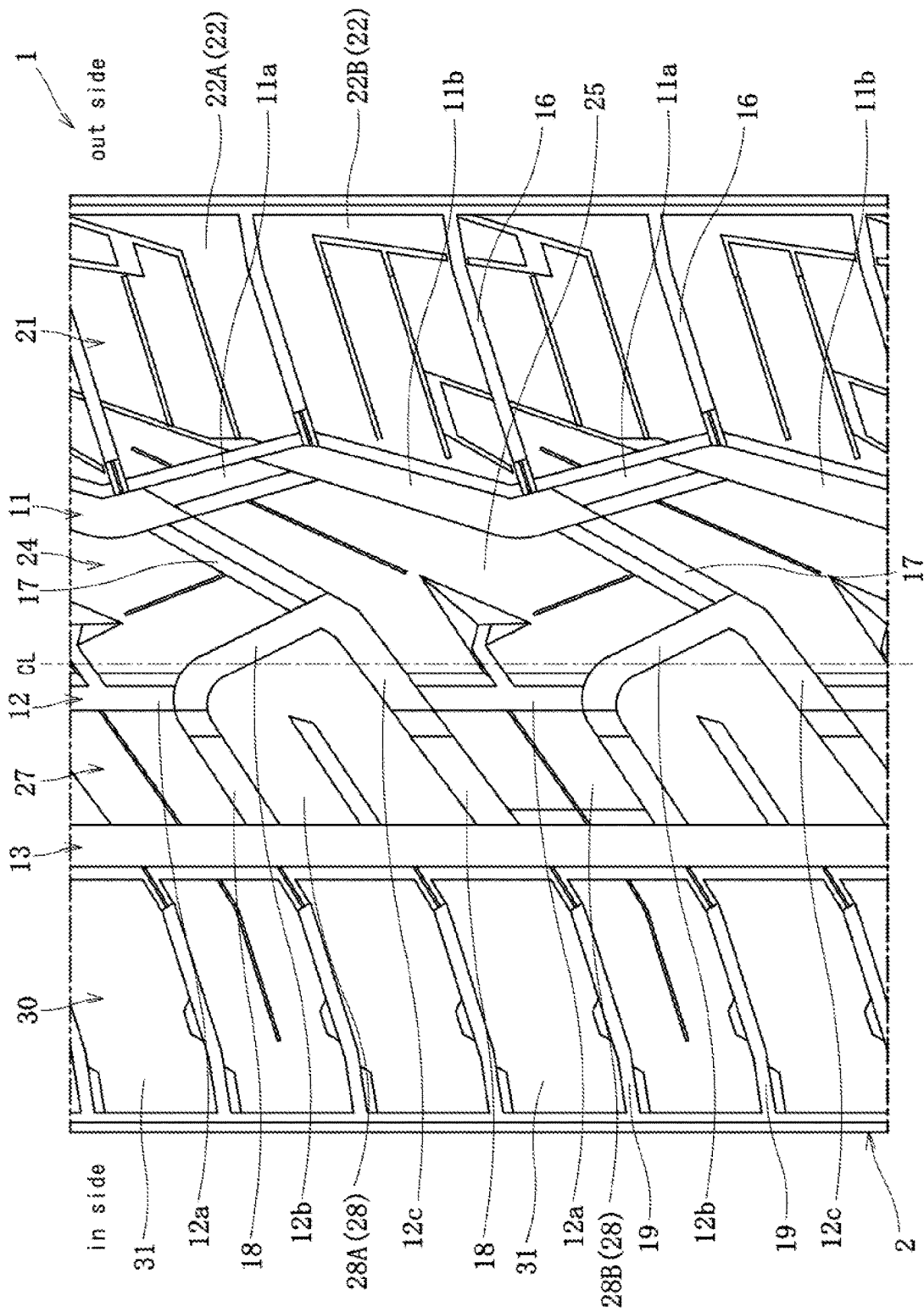
FIG. 1 is a partially developed view showing a tread portion of a pneumatic tire according to an embodiment of the present invention.

FIG. 1 shows a pneumatic tire (hereinafter referred to as "tire") 1 according to the embodiment of the present invention. The tire 1 includes a tread portion 2 extending in a tire width direction, a pair of sidewall portions (not shown) extending inward in a tire radial direction from both ends of the tread portion 2, and a pair of bead portions (not shown) each provided at an inner end of a corresponding one of the pair of sidewall portions in the tire radial direction. In the tread portion 2, a plurality of blocks are formed by a plurality of main grooves extending in a tire circumferential direction and a plurality of lateral grooves extending in the tire width direction.

Specifically, the tire 1 includes a first main groove 11, a second main groove 12, and a third main groove 13 arranged from an outside (right side in FIG. 1) to an inside (left side in FIG. 1) in that order with the tire 1 mounted on a vehicle. The first main groove 11, the second main groove 12, and the third main groove 13 are depressed inward in the tire radial direction.

The first main groove 11 is provided on the outside and extends in a zigzag shape in the tire circumferential direction. Specifically, the first main groove 11 includes a first inclined portion 11a extending in the tire circumferential direction (lower side in FIG. 1) and obliquely outward in the tire width direction, and a second inclined portion 11b extending in the tire circumferential direction and obliquely inward in the tire width direction.

The second main groove 12 is disposed at a center in the tire width direction and extends meandering in the tire circumferential direction. The second main groove 12 includes a first groove portion 12a, a second groove portion 12b connected to the first groove portion 12a, and a third groove portion 12c connected to the second groove portion 12b, and the first groove portion 12a is connected to the third groove portion 12c. The first groove portion 12a is located in the vicinity of a center line CL in the tire width direction and extends in the tire circumferential direction. The second groove portion 12b extends from an end of the first groove portion 12a in the tire circumferential direction and obliquely outward in the tire width direction. The third groove portion 12c extends from an end of the second groove portion 12b in the tire circumferential direction and obliquely inward in the tire width direction.

The third main groove 13 is provided on the inside and extends on the same circumference in the tire circumferential direction (in FIG. 1, the third main groove 13 is a straight groove extending in the vertical direction).

An outermost region in the tire width direction defined by the first main groove 11 is an outer shoulder portion 21. A region defined by the first main groove 11 and the second main groove 12 is an outer center portion 24. A region defined by the second main groove 12 and the third main groove 13 is an inner center portion 27. An innermost region in the tire width direction defined by the third main groove 13 is an inner shoulder portion 30. That is, in FIG. 1, the outer shoulder portion 21 and the outer center portion 24 are formed on the right side relative to the center line CL in the tire width direction, and the inner center portion 27 and the inner shoulder portion 30 are formed on the left side relative to the center line CL in the tire width direction.

The tire 1 includes a first lateral groove 16 formed in the outer shoulder portion 21, a second lateral groove 17 formed in the outer center portion 24, a third lateral groove 18 formed in the inner center portion 27, and a fourth lateral groove 19 formed in the inner shoulder portion 30.

The first lateral groove 16, the second lateral groove 17, the third lateral groove 18, and the fourth lateral groove 19 are all depressed inward in the tire radial direction. The first lateral groove 16, the second lateral groove 17, the third lateral groove 18, and the fourth lateral groove 19 all extend obliquely outward in the tire width direction and in the same tire circumferential direction (upper side in FIG. 1). The fourth lateral groove 19 is larger in inclination angle to a straight line extending in the tire width direction than the first lateral groove 16. In the order of the fourth lateral groove 19, the third lateral groove 18, and the second lateral groove 17, the inclination angle to the straight line extending in the tire width direction becomes larger.

One end of the first lateral groove 16 communicates with the first main groove 11, and the other end of the first lateral groove 16 is open. One end of the second lateral groove 17 communicates with the first main groove 11, and the other end of the second lateral groove 17 communicates with the second main groove 12. One end of the third lateral groove 18 communicates with the second main groove 12, and the other end of the third lateral groove 18 communicates with the third main groove 13. One end of the fourth lateral groove 19 communicates with the third main groove 13, and the other end of the fourth lateral groove 19 is open.

The main grooves 11 to 13 and the lateral grooves 16 to 19 form a plurality of blocks 22, 25, 28, 31 arranged in four rows in the tire width direction and in the tire circumferential direction. Specifically, the first lateral groove 16 and the first main groove 11 provide, in the outer shoulder portion 21, first outer shoulder blocks 22A and second outer shoulder blocks 22B alternately arranged in the tire circumferential direction. The second lateral groove 17, the first main groove 11, and the second main groove 12 provide, in the outer center portion 24, outer center blocks 25 arranged side by side in the tire circumferential direction. The third lateral groove 18, the second main groove 12, and the third main groove 13 provide, in the inner center portion 27, first inner center blocks 28A and second inner center blocks 28B alternately arranged in the tire circumferential direction. The fourth lateral groove 19 and the third main groove 13 provide, in the inner shoulder portion 30, inner shoulder blocks 31 arranged side by side in the tire circumferential direction.

A ratio of the numbers of the outer center blocks 25, the inner center blocks 28, and the inner shoulder blocks 31 is 1:2:3. This represents that the number of blocks becomes larger toward the inside in the tire width direction, and the size of each block in the tire circumferential direction becomes smaller toward the inside in the tire width direction. Note that a ratio between the numbers of the outer center blocks 25 and the outer shoulder blocks 22 is 1:2.

Of the plurality of types of blocks 22, 25, 28, 31, the outer center block 25 is the largest in size. The outer center blocks (hereinafter, abbreviated as "blocks") 25 have a shape that is excellent in both functionality and designability, as viewed from the outside in the tire radial direction. Further, each of the blocks 25 is provided with a depression 40 that increases heat dissipation and three narrow grooves 47 to 49 that increase edge performance.

Figure 2:
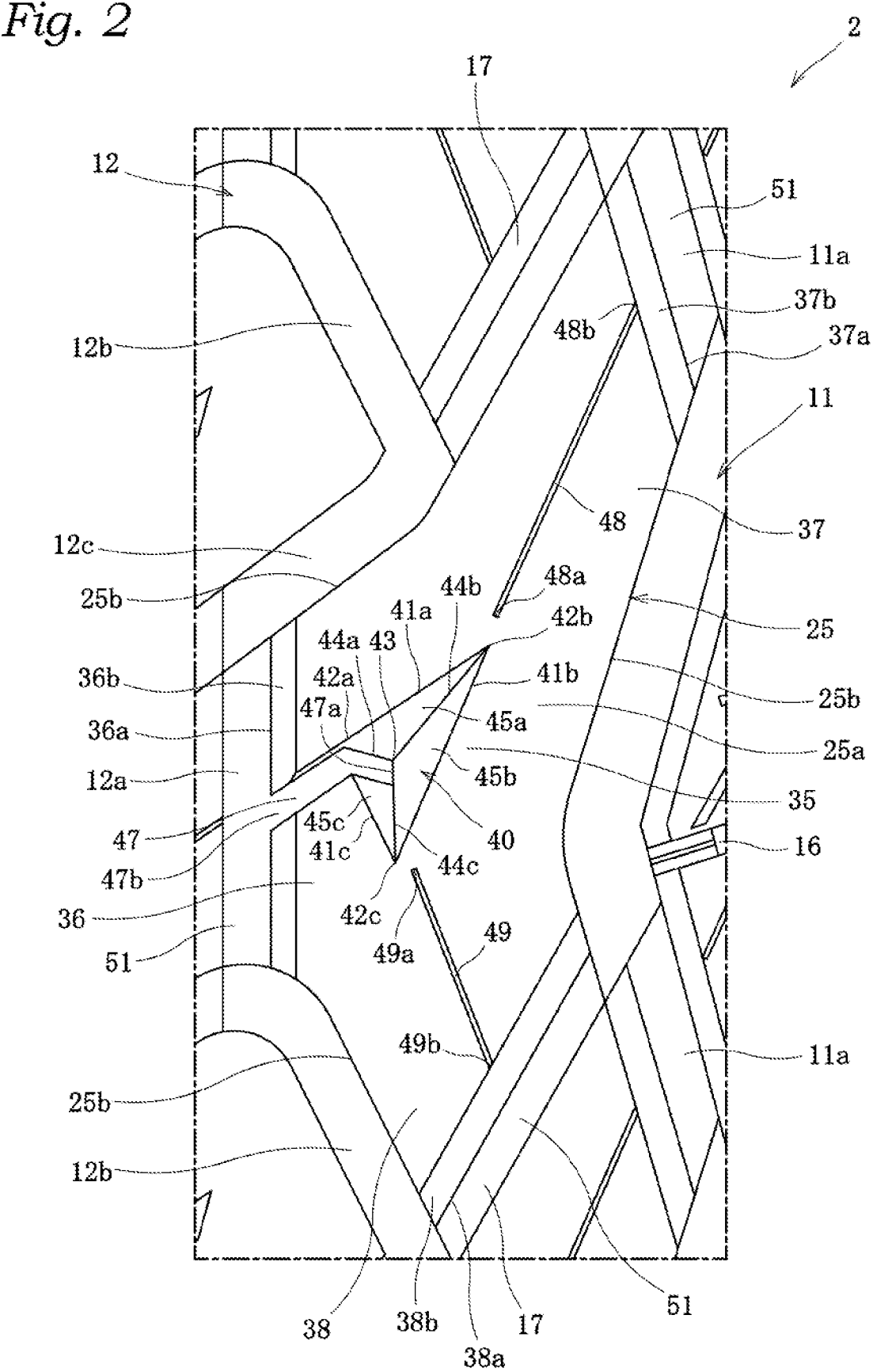
FIG. 2 is a partially enlarged view of FIG. 1.
Figure 3:
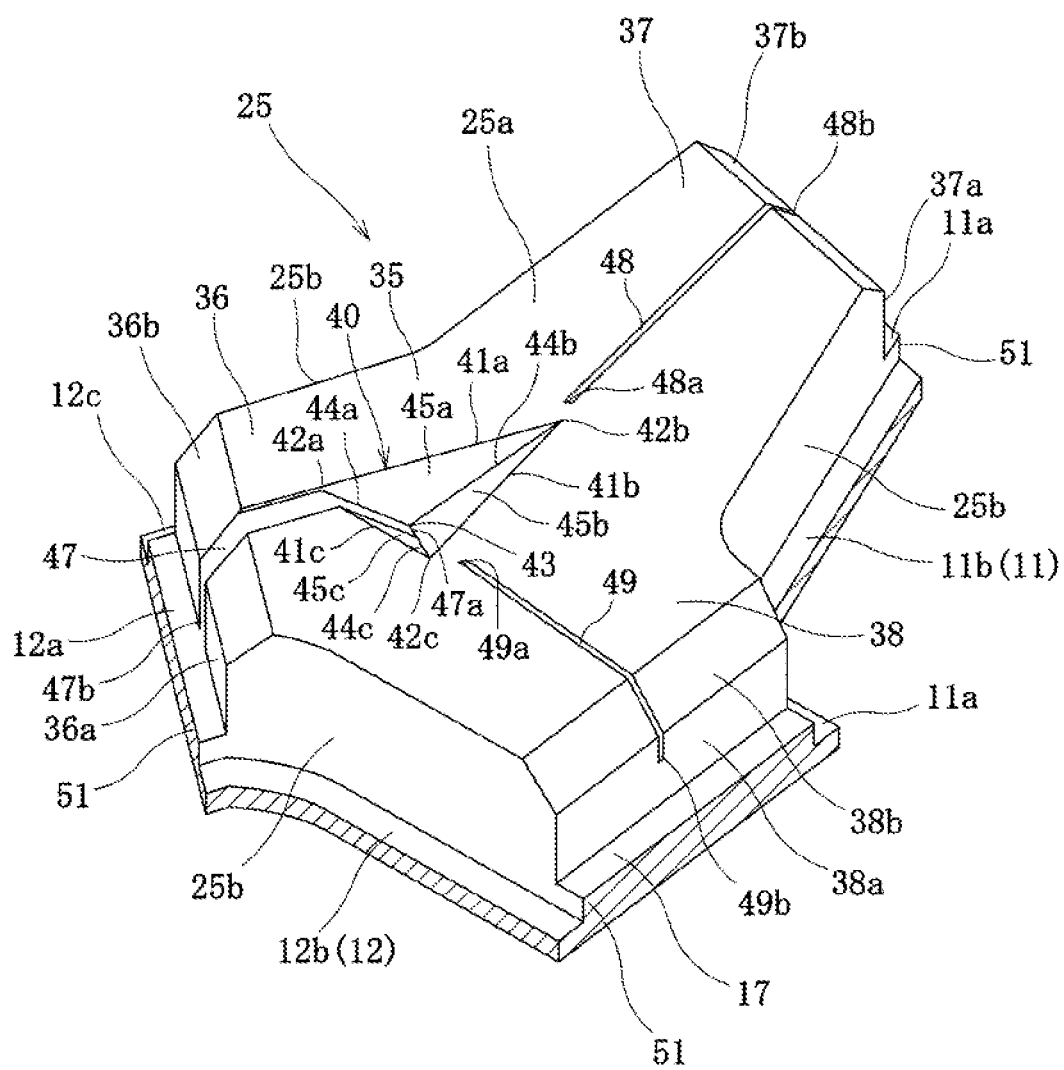
FIG. 3 is a perspective view of a block shown in FIG. 2.

As shown in FIGS. 2 and 3, the block 25 includes a base portion 35 and three protruding portions 36 to 38 protruding radially from the base portion 35. The protruding portion (second protruding portion) 36 protrudes from the base portion 35 substantially in the tire width direction to increase rigidity in the tire width direction. The protruding portion (first protruding portion) 37 and the protruding portion (third protruding portion) 38 protrude from the base portion 35 in two ways obliquely relative to the tire circumferential direction to increase the rigidity in the oblique directions.

Specifically, the base portion 35 is a center portion of the block 25 defined by the first main groove 11, the second main groove 12, and a pair of the second lateral grooves 17. The protruding portion 36 is defined by the first groove portion 12a of the second main groove 12, a part of the second groove portion 12b that merges with the first groove portion 12a, and the third groove portion 12c. The protruding portion 37 is defined by the first inclined portion 11a and the second inclined portion 11b of the first main groove 11, and one of the second lateral grooves 17. The protruding portion 38 is defined by one of the second lateral grooves 17, a part of the first inclined portion 11a of the first main groove 11 that merges with the second inclined portion 11b, and the second groove portion 12b of the second main groove 12.

In the order of the protruding portion 36, the protruding portion 38, and the protruding portion 37, the protrusion dimension from the base portion 35 becomes larger. The block 25 including the protruding portion 36, the protruding portion 38, and the protruding portion 37 has a substantially Y shape and is excellent in designability. In addition, the protruding portions 36 to 38 protruding in different directions increase strength against a force acting on the block 25 during cornering, which in turn increases cornering performance (functionality).

The depression 40 is formed in the base portion 35 and is depressed from a top surface 25a of the block 25 inward in the tire radial direction to have a triangular pyramid shape. Note that the depression 40 is not limited to a triangular pyramid shape in a geometric sense, and sides and surfaces of the depression 40 may be curved.

Specifically, the depression 40 includes three sides 41a to 41c formed on the top surface 25a. In the depression 40, a corner portion (first corner portion) 42a is formed by a side (first side) 41a and a side (third side) 41c, a corner portion (second corner portion) 42b is formed by the side 41a and a side (second side) 41b, and a corner portion (third corner portion) 42c is formed by the side 41b and the side 41c. The corner portion 42a is directed to the protruding portion 36, the corner portion 42b is directed to the protruding portion 37, and the corner portion 42c is directed to the protruding portion 38.

The depression 40 includes an inclined side 44a extending from the corner portion 42a to an apex 43 on a bottom of the depression 40, an inclined side 44b extending from the corner portion 42b to the apex 43, and an inclined side 44c extending from the corner portion 42c to the apex 43. As viewed from the outside in the tire radial direction, the apex 43 is located inside a triangular shape surrounded by the sides 41a to 41c. The sides 41a to 41c form, in the depression 40, an inclined surface 45a extending from the side 41a obliquely inward in the tire radial direction to have a triangular shape, and an inclined surface 45b extending from the side 41b obliquely inward in the tire radial direction to have a triangular shape, and an inclined surface 45c extending from the side 41c obliquely inward in the tire radial direction to have a triangular shape. The inclined surfaces 45a to 45c are flat surfaces in the present embodiment.

A depth of the depression 40, that is, a dimension in the tire radial direction from the top surface 25a to the apex 43 is set in a range of from 3 mm to 8 mm, both inclusive (from 30% to 80%, both inclusive, of a depth of the main grooves 11, 12 and a depth of the second lateral groove 17), and is set to 5 mm in the present embodiment. Further, a proportion of a projected area (opening area) of the depression 40 to a projected area of the top surface 25a is set in a range of from 5% to 20%, both inclusive. This prevents the heat dissipation effect of the block 25 from becoming insufficient and the rigidity of the block 25 from becoming low.

The narrow grooves 47 to 49 are provided extending radially from the depression 40 (base portion 35). The narrow groove (second narrow groove) 47 extends from the depression 40 to a center of a side surface 36a serving as a tip of the protruding portion 36. The narrow groove (first narrow groove) 48 extends from the depression 40 to a center of a side surface 37a serving as a tip of the protruding portion 37. The narrow groove (third narrow groove) 49 extends from the depression 40 to a center of a side surface 38a serving as a tip of the protruding portion 38.

The narrow grooves 47 to 49 are depressed from the top surface 25a inward in the tire radial direction. Of the narrow grooves 47 to 49, the narrow groove 47 is provided to increase the ability to drain water in the depression 40 and the edge performance during traveling. The narrow grooves 48, 49 are provided to increase the edge performance during traveling. A groove width that is a dimension in a direction orthogonal to the direction in which each of the narrow grooves 47 to 49 extend is smaller than a groove width of the main grooves 11 to 13 and a groove width of the second lateral grooves 16 to 19. The groove width of the narrow groove 47 serving as a drainage groove is larger than the groove width of the narrow grooves (sipes) 48, 49. For example, the groove width of the main grooves 11 to 13 and the groove width of the second lateral grooves 16 to 19 are in a range of from 13 mm to 20 mm, both inclusive, the groove width of the narrow groove 47 is in a range of from 4 mm to 8 mm, both inclusive, and the groove width of the narrow grooves 48, 49 is in a range of from 0.6 mm to 1.0 mm, both inclusive. Further, the narrow groove 47 is smaller in total length than the narrow grooves 48, 49.

The narrow grooves 47 to 49 are arranged at predetermined intervals in a circumferential direction around the depression 40. Specifically, angles between the narrow grooves 47 to 49 adjacent to each other are set in a range of from 60 degrees to 180 degrees, both inclusive. In the present embodiment, an angle between the narrow grooves 47, 48 is set to 148 degrees, an angle between the narrow grooves 48, 49 is set to 134 degrees, and an angle between the narrow grooves 49, 47 is set to 78 degrees. When the angles are set out of the above ranges, an imbalance occurs among the directions in which the narrow grooves 47 to 49 extend, which prevents the edge effect from being produced in all directions of the top surface 25a. In order to produce the edge effect uniformly in all directions of the top surface 25a, it is preferable that the angles between the narrow grooves 47 to 49 adjacent to each other are set in the above predetermined ranges. Note that, in the present embodiment, since the narrow grooves 47 to 49 are provided extending in the directions in which the protruding portions 36 to 38 protrude, the above angle range formed by the narrow grooves 47 to 49 corresponds to an angle range of the directions in which the protruding portions 36 to 38 protrude.

The narrow groove 47 extends along the side 41a of the depression 40 to substantially equally divide the protruding portion 36 into two. The narrow groove 47 is provided extending from the depression 40 to the side surface 36a of the protruding portion 36 that defines the second main groove 12 to cause the depression 40 and the second main groove 12 to communicate with each other. An inner end 47a of the narrow groove 47 is connected to the corner portion 42a to be open to the depression 40 (open at the inclined surface 45c), and an outer end 47b of the narrow groove 47 is open, at the side surface 36a, to the second main groove 12. A depth of the narrow groove 47 in the tire radial direction is set larger than the depth of the depression 40 and equal to a depth D2 from the top surface 25a to a raised portion 51 to be described later. This causes the inner end 47a of the narrow groove 47 to extend in a slit shape from the corner portion 42a to the apex 43.

The narrow groove 48 extends along the side 41b of the depression 40 to substantially equally divide the protruding portion 37 into two. The narrow groove 48 is provided extending from the vicinity of the depression 40 to the side surface 37a of the protruding portion 37 that defines the first main groove 11. An inner end 48a of the narrow groove 48 is located adjacent to the corner portion 42b, and an outer end 48b of the narrow groove 48 is open, at the side surface 37a, to the first main groove 11. A depth of the narrow groove 48 in the tire radial direction is set larger than the depth of the depression 40 and smaller than the depth from the top surface 25a to the raised portion 51.

The narrow groove 49 extends along the side 41c of the depression 40 to substantially equally divide the protruding portion 38 into two. The narrow groove 49 is provided extending from the vicinity of the depression 40 to the side surface 38a of the protruding portion 38 that defines the second lateral groove 17. An inner end 49a of the narrow groove 49 is located adjacent to the corner portion 42c, and an outer end 49b of the narrow groove 49 is open, at the side surface 38a, to the second lateral groove 17. A depth of the narrow groove 49 in the tire radial direction is set larger than the depth of the depression 40 and smaller than the depth from the top surface 25a to the raised portion 51.

As described above, the narrow grooves 48, 49 are not connected to the depression 40 and are located at a distance from the depression 40 (corner portions 42b, 42c). This distance, that is, the shortest distance from the inner ends 48a, 49a of the narrow grooves 48, 49 to the depression 40 is set in a range of from 2 mm to 10 mm, both inclusive, preferably a range of from 3 mm to 6 mm, both inclusive. When the distance is too small, the inner ends 48a, 49a of the narrow grooves 48, 49 are split by a load applied during traveling to connect to the depression 40, which may reduce the rigidity of the block 25. When the distance is too large, the total lengths of the narrow grooves 48, 49 become smaller, which reduces a degree of contribution to producing the edge effect. To avoid such inconveniences, it is preferable that the distance between the narrow grooves 48, 49 and the depression 40 be set in the above predetermined range.

Figure 4:
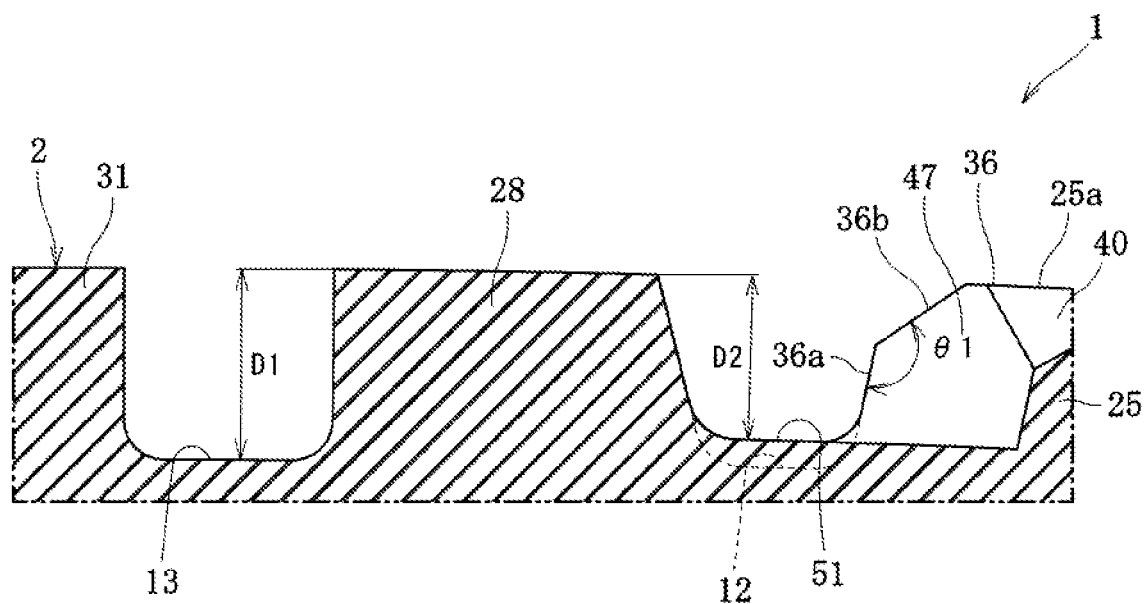
FIG. 4 is a cross-sectional view taken along a first narrow groove.
Figure 5:
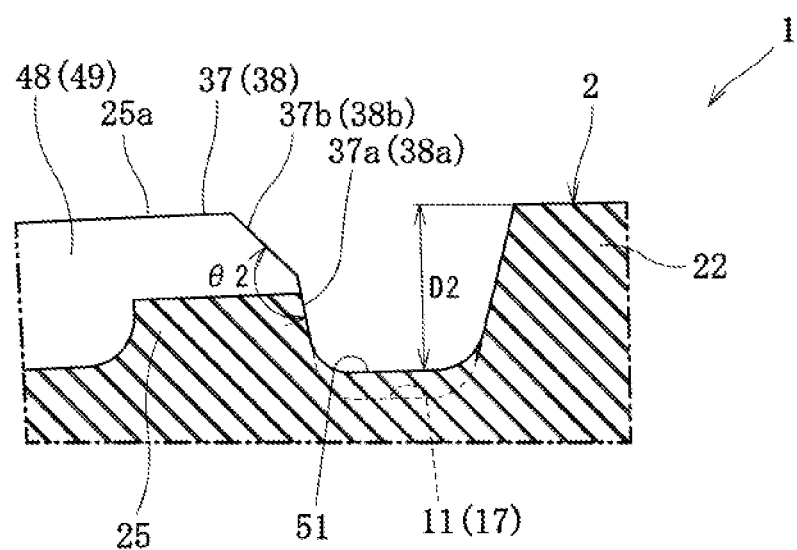
FIG. 5 is a cross-sectional view taken along a second narrow groove.

As shown in FIG. 3 to FIG. 5, inclined surface 36b to 38b that increase the rigidity of the block 25 are formed on the protruding portions 36 to 38 where the narrow grooves 47 to 49 are formed. The inclined surface (second inclined surface) 36b is provided at a corner portion between the top surface 25a and the side surface 36a. The inclined surface 36b extends, toward a groove bottom of the second main groove 12, from the top surface 25a to the side surface 36a and is inclined inward in the tire radial direction. The inclined surface (first inclined surface) 37b is provided at a corner portion between the top surface 25a and the side surface 37a. The inclined surface 37b extends, toward a groove bottom of the first main groove 11, from the top surface 25a to the side surface 37a and is inclined inward in the tire radial direction. The inclined surface (third inclined surface) 38b is provided at a corner portion between the top surface 25a and the side surface 38a, The inclined surface 38b extends, toward a groove bottom of the second lateral groove 17, from the top surface 25a to the side surface 38a and is inclined inward in the tire radial direction. The inclined surfaces 36b to 38b are provided in a range including the outer ends 47b to 49b of the narrow grooves 47 to 49.

An angle θ1 formed by the side surface 36a and the inclined surface 36b and an angle θ2 formed by the side surfaces 37a, 38a and the inclined surfaces 37b, 38b are set in a range of from 120 degrees to 160 degrees, both inclusive. When the angles θ1, θ2 are too small, the area of the top surface 25a is reduced, which in turn lowers braking performance. When the angles θ1, θ2 are too large, the corner portions between the inclined surfaces 36b to 38b and the top surface 25a become prone to deform, which in turn reduces a degree of contribution to increasing the rigidity. To avoid such inconveniences, it is preferable that the angles θ1, θ2 be set in the above predetermined range.

Further, the angle θ1 of the protruding portion 36 where the narrow groove 47 serving as a drainage groove is formed is smaller than the angle θ2 of the protruding portions 37, 38 where the narrow grooves (sipes) 48, 49 are formed. That is, the larger the groove widths of the narrow grooves 47 to 49, the larger the inclination angles of the inclined surfaces 36b to 38b. This configuration can effectively suppress deformation of the block 25 to increase the rigidity and steering stability. Note that the angle formed between the side surface 37a and the inclined surface 37b of the protruding portion 37 may be different from the angle formed between the side surface 38a and the inclined surface 38b of the protruding portion 38.

The raised portion 51 raised radially outward is formed on parts of the grooves 11, 12, 17 that define the block 25, the parts of the grooves 11, 12, 17 being adjacent to the side surfaces 36a to 38a of the protruding portions 36 to 38. Specifically, the raised portion 51 is provided on the first groove portion 12a of the second main groove 12 adjacent to the side surface 36a of the protruding portion 36, the first inclined portion 11a of the first main groove 11 adjacent to the side surface 37a of the protruding portion 37, and the second lateral groove 17 adjacent to the side surface 38a of the protruding portion 38.

No raised portion 51 is provided on a part of each of the grooves 11, 12, 17 that is adjacent to a side surface 25b of the block 25 where the narrow grooves 47, 48, 49 are not formed. As shown in FIGS. 4 and 5, a depth D1 of the grooves 11, 12, 17 where no raised portion 51 is provided is larger than the depth D2 of the grooves where the raised portion 51 is provided. The depth D1 is a dimension in the tire radial direction from the top surface 25a to the groove bottom, and the depth D2 is a dimension in the tire radial direction from the top surface 25a to the raised portion 51. For example, the depth D1 is in a range of from 6.0 mm to 14.0 mm, both inclusive, and the depth D2 is in a range of from 5.0 mm to 12.0 mm, both inclusive.

Next, a description will be given of features of the pneumatic tire 1 of the present embodiment.

In general, corner portions of the block 25 formed by the side surfaces 36a to 38a and the top surface 25a are divided by the formation of the narrow grooves 47 to 49, which makes the corner portions prone to deform and in turn makes the rigidity prone to being lower. However, since the inclined surfaces 36b to 38b are provided on the side surfaces 36a to 38a of the block 25, it is possible to eliminate corner portions that have acute angles and are thus prone to deform. Accordingly, it is possible to increase, by the inclined surfaces 36b to 38b, the rigidity of the block 25 and the steering stability afforded by the rigidity with the edge effect kept high by the narrow grooves 47 to 49.

In particular, when the narrow grooves 47 to 49 are formed extending toward the side surfaces 36a to 38a of the protruding portions 36 to 38 included in the block 25, the rigidity of the protruding portions 36 to 38 tends to be remarkably lowered. However, since the inclined surfaces 36b to 38b are provided on the side surfaces 36a to 38a included in the protruding portions 36 to 38, the rigidity of the block 25 can be effectively kept high, and the steering stability can be increased, as compared with a configuration where the inclined surfaces 36b to 38b are not provided.

As described above, the angles θ1, θ2 formed by the side surfaces 36a to 38a and the inclined surfaces 36b to 38b are in the range of from 120 degrees to 160 degrees, both inclusive. This configuration can prevent the braking performance from being lowered due to a reduction in area of the top surface 25a and can effectively increase the rigidity of the block 25.

As described above, the raised portion 51 is formed on parts of the groove bottoms of the main grooves 11, 12 and the lateral groove 17, the parts of the groove bottoms being adjacent to the side surfaces 36a to 38a. With this configuration, since the total height of the side surfaces 36a to 38a is reduced, it is possible to suppress deformation of the side surfaces 36a to 38a of the block 25 and in turn makes it possible to effectively increase the rigidity of the block 25.

As described above, the angle θ1 of the protruding portion 36 where the narrow groove 47 serving as a drainage groove is formed is smaller than the angle θ2 of the protruding portions 37, 38 where the narrow grooves (sipes) 48, 49 are formed. This configuration can effectively suppress deformation of the block 25 to increase the rigidity and steering stability.

Note that the pneumatic tire 1 of the present invention is not limited to the configuration of the above embodiment, and various modifications can be made.

For example, the block where the depression 40 and the narrow grooves 47 to 49 are formed is not limited to the outer center block 25, and may be the first outer shoulder block 22A, the inner center block 28, or the inner shoulder block 31.

The narrow grooves 48, 49 that are not connected to the depression 40 need not extend to the main groove or the lateral groove. That is, the outer ends 48b, 49b of the narrow grooves 48, 49 may be provided at a distance from the side surfaces 37a, 37b, respectively.

The block 25 has a shape including the protruding portions 36 to 38 protruding in the directions in which the narrow grooves 47 to 49 extend, but may have a shape without the protruding portions 36 to 38.

What is claimed is:

1. A pneumatic tire, comprising a block formed by at least one main groove extending in a tire circumferential direction and a pair of lateral grooves extending in a tire width direction and provided at a distance from each other in the tire circumferential direction, wherein the block includes:
    a base portion;
    a first protruding portion protruding from the base portion in a first direction which intersects a tire radial direction, and having a first side surface at a distal end of the first protruding portion;
    a second protruding portion protruding from the base portion in a second direction which intersects the tire radial direction and differs from the first direction, and having a second side surface at a distal end of the second protruding portion; and
    a third protruding portion protruding from the base portion in a third direction which intersects the tire radial direction and differs from the first and second directions, and having a third side surface at a distal end of the third protruding portion,
    wherein the block has a substantially Y-shape in which a gap is provided between each of adjacent two of the first, second, and third side surfaces at the distal ends of the first, second, and third protruding portion, respectively,
    wherein the first protruding portion includes:
        a first inclined surface provided at a corner portion between a top surface of the first protruding portion and the first side surface, the first inclined surface extending obliquely toward a groove bottom of the main groove or one of the lateral grooves defined by the first side surface, and
        a first narrow groove extending from the base portion toward the first side surface of the first protruding portion, an outer end of the first narrow groove being located on the first inclined surface, the first narrow groove being smaller in groove width than the main groove and the lateral grooves.

2. The pneumatic tire according to claim 1, wherein an angle formed by the first side surface and the first inclined surface is in a range of from 120 degrees to 160 degrees, both inclusive.

3. The pneumatic tire according to claim 1, wherein a raised portion raised outward in a tire radial direction is formed on a part of the groove bottom of the main groove or one of the lateral grooves, the part of the groove bottom being adjacent to the first side surface.

4. The pneumatic tire according to claim 1, wherein the block includes:
    a second inclined surface provided at a corner portion between a top surface of the second protruding portion and the second side surface, the second inclined surface extending obliquely toward a groove bottom of the main groove or one of the lateral grooves defined by the second side surface; and
    a second narrow groove extending from the base portion toward the second side surface, an outer end of the second narrow groove being located on the second inclined surface, the second narrow groove being smaller in groove width than the main groove and the lateral grooves and larger in groove width than the first narrow groove, and
    wherein an angle formed by the second side surface and the second inclined surface is smaller than an angle formed by the first side surface and the first inclined surface.

* * * * *